United States Patent
Bischoff et al.

(10) Patent No.: US 9,029,491 B2
(45) Date of Patent: May 12, 2015

(54) REPELLENT COATING COMPOSITION AND COATING, METHOD FOR MAKING AND USES THEREOF

(75) Inventors: Claus Bischoff, Skødstrup (DK); Stefan Holberg, Aarhus C (DK)

(73) Assignee: Teknologisk Institut, Taastrup (DK)

( * ) Notice: Subject to any disclaimer, the term of this patent is extended or adjusted under 35 U.S.C. 154(b) by 0 days.

(21) Appl. No.: 13/997,402

(22) PCT Filed: Dec. 20, 2011

(86) PCT No.: PCT/DK2011/050517
§ 371 (c)(1), (2), (4) Date: Aug. 9, 2013

(87) PCT Pub. No.: WO2012/083970
PCT Pub. Date: Jun. 28, 2012

(65) Prior Publication Data
US 2013/0315855 A1    Nov. 28, 2013

(30) Foreign Application Priority Data

Dec. 22, 2010    (DK) ................................ 2010 70577

(51) Int. Cl.
| | |
|---|---|
| C08G 77/22 | (2006.01) |
| C09D 5/16 | (2006.01) |
| C09D 183/04 | (2006.01) |
| F28F 19/04 | (2006.01) |
| B05D 5/08 | (2006.01) |
| C08G 77/16 | (2006.01) |
| C08K 5/5419 | (2006.01) |
| C08K 5/5455 | (2006.01) |
| F24J 2/46 | (2006.01) |

(52) U.S. Cl.
CPC ............... C09D 5/1675 (2013.01); *B05D 5/08* (2013.01); *C08G 77/16* (2013.01); *C08K 5/5419* (2013.01); *C08K 5/5455* (2013.01); *C09D 183/04* (2013.01); *F24J 2/4612* (2013.01); *F28F 19/04* (2013.01)

(58) Field of Classification Search
USPC .................. 528/28, 38, 34; 428/447
See application file for complete search history.

(56) References Cited

U.S. PATENT DOCUMENTS

| | | | | |
|---|---|---|---|---|
| 5,286,815 | A * | 2/1994 | Leir et al. ................... | 525/477 |
| 5,302,671 | A | 4/1994 | Cifuentes | |
| 5,700,868 | A * | 12/1997 | Hanada ........................ | 524/590 |
| 6,288,198 | B1 * | 9/2001 | Mechtel et al. .............. | 528/28 |
| 6,630,205 | B2 | 10/2003 | Brueck | |
| 6,800,354 | B2 | 10/2004 | Baumann | |
| 7,026,398 | B2 | 4/2006 | Monkiewicz | |
| 7,344,235 | B2 | 3/2008 | Soga | |
| 7,345,131 | B2 * | 3/2008 | Selbertinger et al. ......... | 528/34 |
| 7,495,037 | B2 | 2/2009 | Moszner | |
| 7,544,411 | B2 | 6/2009 | Baumann | |
| 7,578,877 | B2 | 8/2009 | Giessler | |
| 7,658,469 | B2 | 2/2010 | Hino | |
| 7,799,432 | B2 | 9/2010 | Becker-Willinger | |
| 2003/0049486 | A1 | 3/2003 | Ooij | |
| 2005/0187400 | A1 | 8/2005 | Arkles | |
| 2007/0017402 | A1 | 1/2007 | Jordens | |
| 2008/0090010 | A1 | 4/2008 | Zhang | |
| 2009/0099287 | A1 | 4/2009 | Gier | |
| 2010/0015344 | A1 | 1/2010 | Groenewolt | |
| 2010/0291487 | A1 * | 11/2010 | Nakajima et al. ............. | 430/313 |

FOREIGN PATENT DOCUMENTS

| | | |
|---|---|---|
| DE | 10106342 | 8/2002 |
| DE | 10153352 | 5/2003 |
| DE | 102004050747 A1 | 4/2006 |
| DE | 102005019488 | 11/2006 |
| DE | 102007020404 A1 | 10/2008 |
| EP | 1661873 | 5/2006 |
| EP | 1806385 | 7/2007 |
| EP | 1806385 B1 | 4/2009 |
| FR | 2922522 | 4/2009 |
| WO | 2004110926 A1 | 12/2004 |
| WO | 2005014731 A2 | 2/2005 |
| WO | 2005035676 A1 | 4/2005 |
| WO | 2005075112 A1 | 8/2005 |
| WO | 2009004010 A1 | 1/2009 |
| WO | 2009030538 A1 | 3/2009 |
| WO | 2009077666 A2 | 6/2009 |
| WO | 2012018296 A1 | 2/2012 |
| WO | 2012083970 | 6/2012 |

OTHER PUBLICATIONS

Desmodur N 3400 Material Safety Data Sheet, Bayer Material Science LLC, Product Safety & Regulatory Affairs.
Johan Bieleman, Additives for Coatings, Wiley-VCH, pp. 142-143, 2000.
Joel Zazyczny, et al., Enhanced Substrate Adhesion, Dipodal Silanes, pp. 1-3, Nov. 2008, Gelest.
Barry Arkles, Hydrophobicity, Hydrophilicity and Silanes, Paint & Coatings Industry, Reprint, Oct. 2006, Gelest Inc., Morrisville, PA.

* cited by examiner

*Primary Examiner* — Margaret Moore
(74) *Attorney, Agent, or Firm* — James Creighton Wray

(57) ABSTRACT

A cross-linkable coating composition comprises (i) one or more silanes having either at least three hydrolysable groups, or at least two hydrolysable groups and at least one organofunctional group capable of forming chemical bonds upon curing, wherein (i.a) the sum of said silanes constitutes at least 20% of the total mass of the coating compositions combined solids and silanes, and (i.b) said silanes are possibly partly or completely hydrolyzed and possibly partly condensed, and (ii) at least one low surface energy additive, wherein (ii.a) said low surface energy additive comprises polydimethylsiloxane chemically bonded to at least one functional group, (ii.b) said functional group is configured for the polydimethylsiloxane moiety to cross-link with said coating composition, (ii.c) said polydimethylsiloxane constitutes 0.01% to 15% of the mass of said cured coating, when said coating composition is cured, and (ii.d) said polydimethylsiloxane moiety has a molecular weight of more than 1600 g/mol.

19 Claims, 4 Drawing Sheets

REPELLENT COATING COMPOSITION AND COATING, METHOD FOR MAKING AND USES THEREOF

Figure 1:
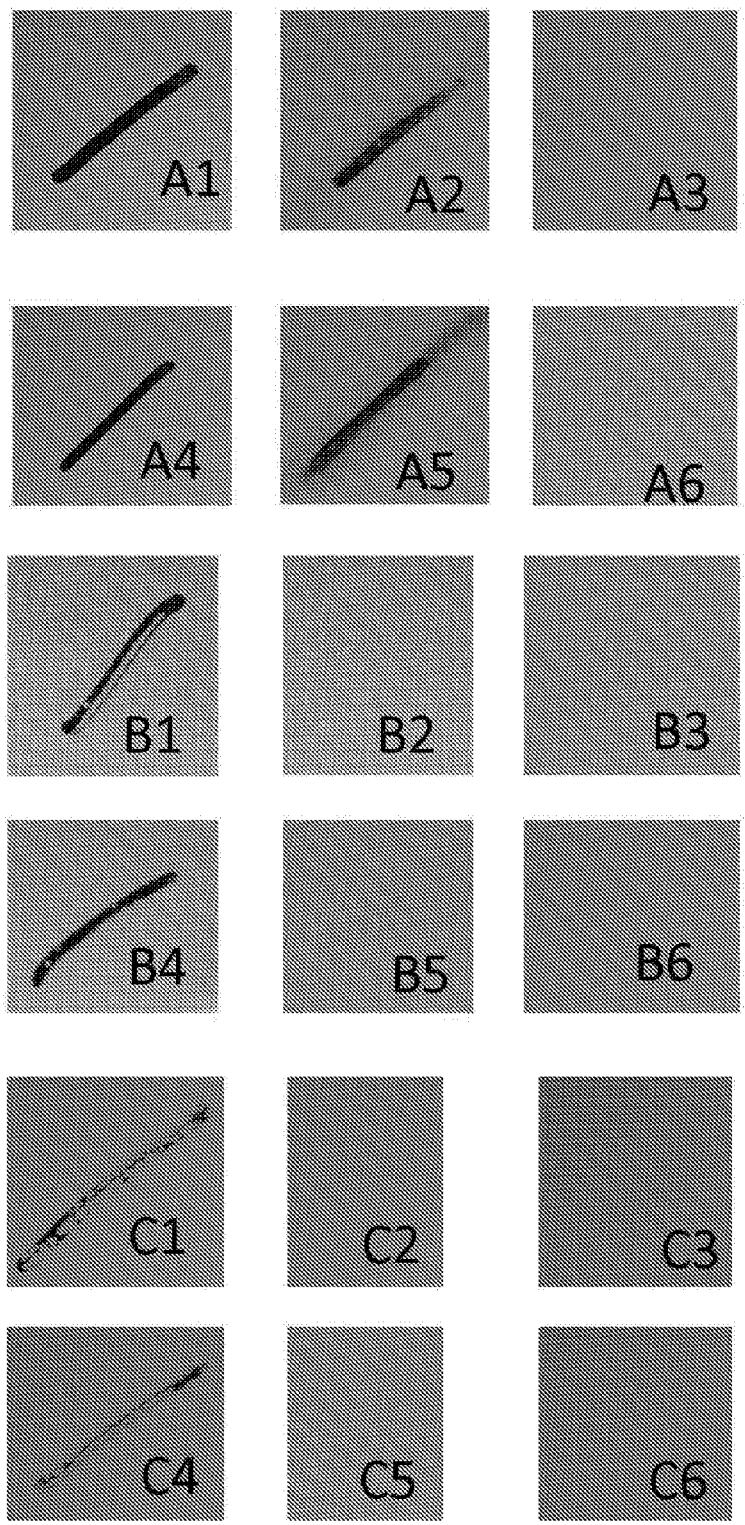
Figure 2:
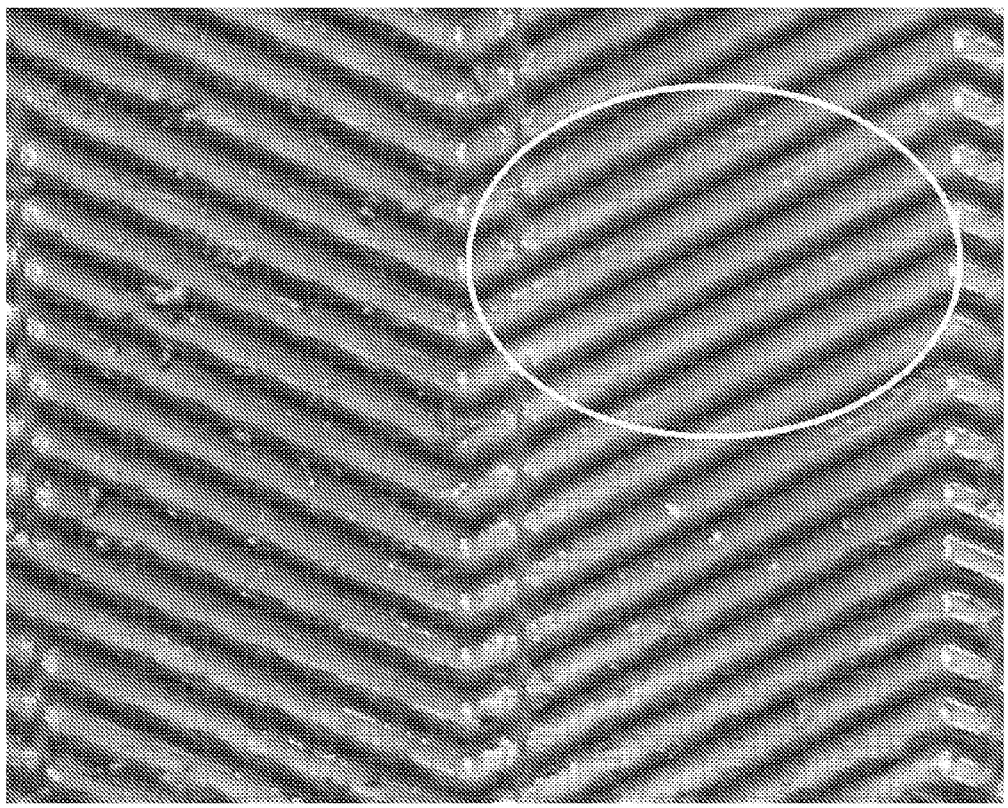
Figure 3:
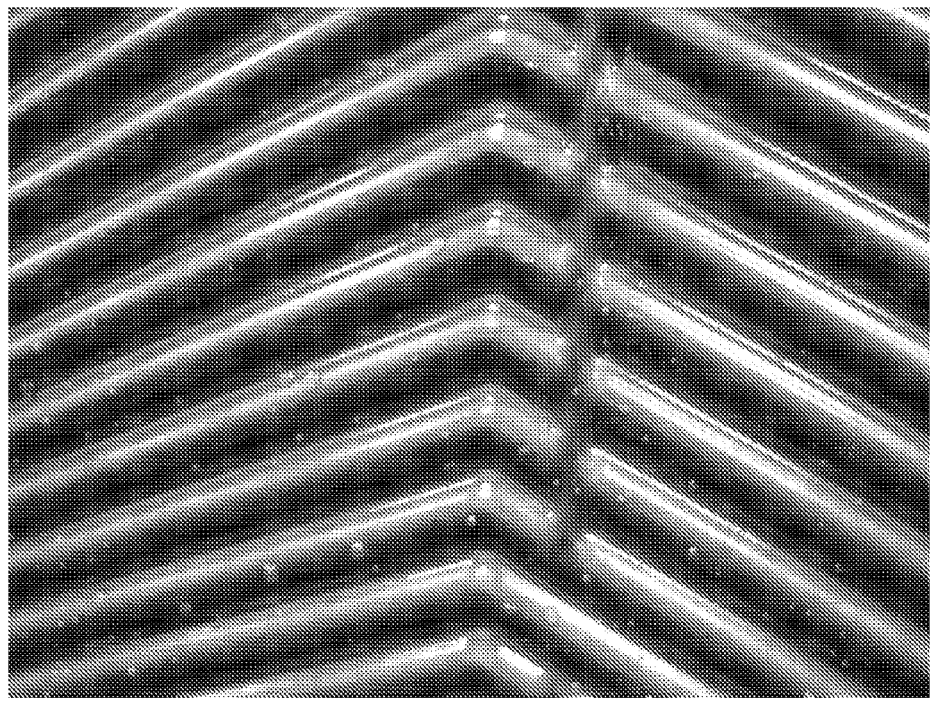
Figure 4:
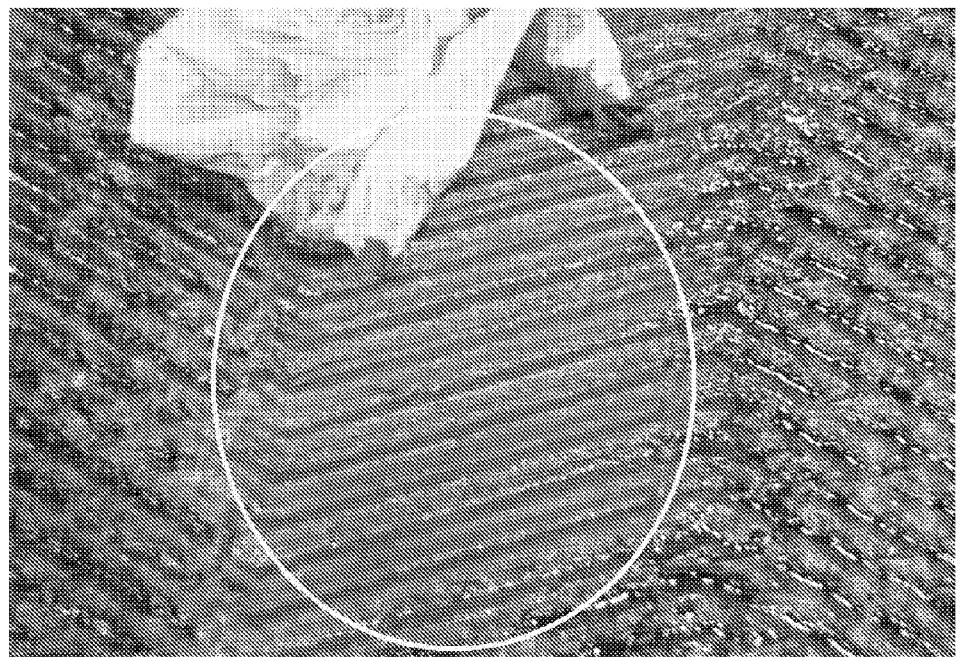

This application claims the benefit of Danish Application No. PA 2010 70577 filed Dec. 22, 2010, and PCT/DK filed Dec. 22, 2011, International Publication No. WO 2012/083970, which are hereby incorporated by reference in their entirety as if fully set forth herein.

FIELD OF THE INVENTION

This invention relates to a coating composition, a coating based thereon, the use of such coating on structures and methods for applying such coating or coating composition on said structures to repel unwanted material from the surfaces of the structures.

BACKGROUND OF THE INVENTION

Geometrical structures of different forms and with a surface subjected to contact with a material or a substance for containment, enclosure, support, transport, guides or alike of the given material or substance, which material or substance can be solids, fluids or mixtures thereof.

It is a generally know problem, that the geometrical structures need to be as little as possible damaged or influenced by the material or substance in contact with the surface of the geometrical structures.

To fulfil the primary purposes of containing, enclosure, transporting or guiding, the geometrical structures must be structurally stable and provide sufficient structural support for the material or substance to be handled or carried.

One example of accumulation of unwanted material, dirt or substances over time is known as fouling.

Another example of accumulation of unwanted material is known as scaling in which case minerals such as chalk accumulate on the structures.

As an example the case of fouling, which exist on different scales that are defined as micro and macro scale or as biofouling or inorganic fouling, the surface of a given structure tends to change over time as the fouling material tends to accumulate or to grow and thereby change the properties of the structure's interaction with the material or substance for which the structure is intended for. At either scale fouling results in numerous technical problems or loss of efficiency of the technical systems.

There are already known numerous coating compositions which provide a repellent surface. According to the book "Nanotechnology" by S. Sepeur (Vincentz Network, 2008):
  A repellent surface, also called Easy-To-Clean surface, is a surface providing a low surface energy leading to hydrophobicity defined by the surface providing a static water contact angle above 90° and possibly additionally leading to oleophobicity,
  Fluoropolymers and Polydimethylsiloxane are commonly used in the industry to obtain a low surface energy, with both having the disadvantage of being less scratch resistant and showing adhesion problems, and
  Silane coating materials comprising silanes with perfluoroalkyl moieties have been developed to improve scratch resistance and adhesion.
These silane based coatings comprising perfluoroalkylsilanes provide scratch and abrasion resistance with respect to visible scratches as is described U.S. Pat. No. 6,630,205, but the abrasion resistance of the coating surface's repellent properties is limited and not well documented.

US 2008/090010 A1 discloses a nanostructured hydrophobic coating suitable for reducing fouling, de-icing, comprising a monopodal silane and a low surface energy component, such as hydroxyl terminated polysiloxane. Said polysiloxane may be polydimethylsiloxane. Abrasion resistance was not investigated. The coating does not contain a polypodal silane having at least one urea or thiourethane linkage between the at least two Si atoms present in the silane molecule.

US 2003/049486 A1 discloses a coating composition comprising a monopodal silane (a vinyl silane) and polypodal silane (a bisalkoxy-silyl functional amine). The coating has anti-corrosion properties. The coating does not contain any low surface energy additive and does not contain a polypodal silane having at least one urea or thiourethane linkage between the at least two Si atoms present in the silane molecule. Addition of a low energy surface component, such as a polysiloxane to the composition is not disclosed.

WO 2009/030538 A1 discloses aqueous compositions comprising condensation products of monopodal silanes, such as basic aminosilanes and a polypodalsilane such as bis-alkoxysilyl functional amines Specific embodiments provide repellent hydrophobic surfaces by comprising perflouralkysilanes as low surface energy additive. The coating does not contain polydimethylsiloxane as surface energy additive and does not contain a polypodal silane having at least one urea or thiourethane linkage between the at least two Si atoms present in the silane molecule.

DE 102007020404 A1 disclose coatings comprising polypodal silanes in combination with a fluor containing low surface energy additive. The coatings are virtually free of monopodal silanes. The coatings do not contain a polypodal silane with at least one urea or thiourethane linkage between the at least two Si atoms present in the silane molecule. Furthermore no polydimethylsiloxane as a low-surface-energy additive is disclosed.

DE 10200450747 A1 disclose a coating comprising polypodal silanes. The coatings are virtually free of monopodal silanes. Furthermore no polydimethylsiloxane as a low-surface-energy additive is disclosed.

US 2007/017402 A1 and US 2009/0099287 A1 both discloses coating compositions or solutions containing polysiloxane, in particular polydimethylsiloxane, but with a different purpose and with mechanical and chemical properties and in particular for temperatures required for pyrolysis, e.g. in household ovens. No hydrophobic or repellent properties are mentioned. The coatings do not contain a polypodal silane having at least one urea or thiourethane linkage between the at least two Si atoms present in the silane molecule.

Thus the known coating systems still leave room for improvement, particularly with respect to the abrasion resistance and chemical resistance of the coatings' repellent surface effect.

OBJECT OF THE INVENTION

It is one objective of the present invention to describe a coating that is an improvement compared to previously disclosed coatings. In particularly with respect to the abrasion resistance and/or chemical resistance of the coatings' repellent surface effect as compared to previously disclosed coating systems.

Another objective of the present invention is the provision of a solution or an improvement to each primary and/or secondary technical problem induced by the accumulation of unwanted material, including fouling, scaling or alike, which said problems further requires resources that would otherwise have been saved.

By primary problem is understood the direct loss of efficiency caused by the accumulation of unwanted material. By secondary problem is understood the resources, including time and manpower, needed to maintain a desired or achievable efficiency.

Another objective of the present invention is to describe a solution that repels unwanted material from the surface of the structure thereby maintaining the intended and designed properties of the structure as long as possible without degeneration, at any degree, and thereby maintaining a desired efficiency and reducing the need for maintenances or time in between.

Another objective of the present invention is to describe a solution that allows for an easy cleaning of the surface of the structure thereby reducing cleaning resources such as water, cleaning agents, alike as well as resources such as time and costs.

Yet another objective of the present invention is to describe a solution that is structurally stable and or durable.

DESCRIPTION OF THE INVENTION

In this description a coating or a finish is a layer of a substance spread over a surface such as the surface of a structure. As such a coating is a covering layer that covers partially or completely a structure or part of a structure.

Usually a coating is thicker than a monolayer and usually the thickness of the coating or layer is more than 0.01 μm, but the said thickness is non-limiting.

The coating composition is applied to a structure to form a coating and in the process of forming the coating from the coating composition, reactions between components in the coating composition can take place.

According to the invention at least one objective is achieved by a coating composition as described, a coating composition prepared by a method or process as described.

One way of achieving the objective according to the invention is by a cross-linkable coating composition comprising:
(i) one or more silanes comprising either of the following two options:
  at least three hydrolysable groups or
  at least two hydrolysable groups and at least one organofunctional group capable of forming chemical bonds upon curing, and
  (i.a) the sum of said silanes constitutes at least 20% of the total mass of the coating compositions combined solids and silanes, and
  (i.b) said silanes are possibly partly or completely hydrolysed and possibly partly condensed; and
(ii) at least one low surface energy additive, wherein
  (ii.a) said low surface energy additive comprises polydimethylsiloxane chemically bonded to at least one functional group,
  (ii.b) said functional group is configured for the polydimethylsiloxane moiety to cross-link with said coating composition,
  (ii.c) said polydimethylsiloxane constitutes 0.01% to 15% of the mass of said cured coating, when said coating composition is cured,
  (ii.d) said polydimethylsiloxane moiety has a molecular weight of more than 1600 g/mol.

Thereby in one way achieving the objective of the invention in full or in part, by having a coating composition that, preferably when formed as a surface, will provide a repellent surface. Where it is understood that the coating will result in a surface to which unwanted material, generally dirt, will not stick or from which surface unwanted material is easily removed.

By repellent surface is understood that unwanted material does not wet the surface or sticks less to the surface. At the same time the surface is also robust in that the surface is stable so that the surface will maintain the repellent properties after mechanical and chemical attacks such as rubbing, scratching and/or cleaning with solvents.

One example is a repellent surface coated according to the invention that prevents fouling of a surface.

The coating composition is furthermore advantageous in avoiding or reducing that the repellent surface additive can be leached, extracted or dissolved.

The coating composition is furthermore advantageous in providing a concentration of said polydimethylsiloxane, as a low energy surface additive, sufficient to provide a low energy surface, but low enough not to influence the bulk properties of the cured coating too much.

The coating composition is furthermore advantageous in ensuring excellent repellent properties that can withstand at least some mechanical abrasion due to tear or wear thereby reducing or eliminating scratches or alike in the surface formed by the coating composition.

As a polydimethylsiloxane chain consists of repeating $[(CH_3)_2Si-O-]$ units and each unit has a molecular weight of 74.2 g/mol, a molecular weight of more than 1600 g/mol results in a chain of more than 21 units. This has been found to be sufficient to give the required repellent properties as will be exemplified and compared to examples of coatings with insufficient repellent properties.

The coating composition furthermore ensures that a chemically cross-linked 3D network is build upon curing and thereby providing chemical resistance of said cured coating.

The coating composition is furthermore advantageous in providing means for allowing a substantial amount of silane to be used and thereby providing improved chemical and mechanical stability due to the glass like substructure formed during curing.

The examples in this disclosure exemplifies by a series of tests that the coating as prepared by the coating composition has different properties.

The tests include an adhesion test, a marker test, a surface energy test, a scratch test, and a test weathering stability test.

Furthermore tests of the coating as prepared by the coating compositions on real systems show that the coating is long term robust in the harsh environments.

The said combined mass of solids and silanes is understood as the sum of all the coating compositions solids and all the coating compositions silanes, no matter whether these silanes are volatile like e.g. methyltriethoxysilane and partly evaporate after application of the coating. The combined mass of solids and silanes covers as well reactive groups like e.g. ethoxy groups that may be split of and evaporate while curing such coating composition.

According to the invention it is understood that ex. silanes can be partly or completely hydrolysed and partly condensed thereby providing both hydrolysed and/or non-hydrolysed mixtures.

According to an embodiment of the coating composition, it is distinctive in that the said coating composition comprises one or more silanes comprising either of the following two options:
  at least three hydrolysable groups or
  at least two hydrolysable groups and at least one organofunctional group capable of forming chemical bonds upon curing, and the sum of said silanes constitutes at least 20% of the total mass of the coating compositions combined solids and silanes.

According to an alternative embodiment, a coating composition wherein a cured coating prepared from said coating composition has a silicon (Si) content of 4 to 44% by weight.

Thereby the composition ensures that the coating comprises both glass like structures and organic structures.

It is found that the percentage range of Silicon (Si) content results in a balanced stable coating that is not too brittle. It is expected that a higher concentration of Silicon might lead to too brittle coatings, and thereby in the end in a less stable coating.

It is expected that a lower concentration might lead to a more or less organic coating which coating will not provide the same abrasion resistance and chemical stability.

According to an embodiment of the coating composition, it is distinctive in comprising a silane with one methyl group bonded to silicon and three hydrolysable groups, said silane constituting to at least 10% of the total mass of the coating compositions combined solids and silanes.

Thereby further improving the advantageous balanced stable and non-brittle coating as mentioned. In a particular embodiment of the coating composition, methyltriethoxy/methyltrimethoxy silane is found to be especially useful in getting the right balance of mechanical and chemical resistance as well as flexibility.

According to an embodiment of the coating composition, it is distinctive in that at least 5% of the total mass of the coating compositions combined solids and silanes is a polymodal silane or a polypodal silane comprising at least two silicon atoms, each with two or three hydrolysable groups.

Within this disclosure, both of the terms polymodal and polypodal are used to refer to such silanes comprising at least to silicon atoms, the latter term being more common.

A polypodal silane is a molecule or polymer comprising more than one silicon atom. Said silicon atoms connected by a non-hydrolysable link or network. An example for such non-hydrolysable link is an organic structure connected to a silicon atom through silicon-carbon bond. It is known to the person skilled in the art that the condensation reaction of silanes is possibly reversible. Thus, Si—O—Si bonds as formed by partly condensed silanes are not regarded as non-hydrolysable links according to the invention.

According to an embodiment of the coating composition, it is distinctive in comprising a combination of monomodal and polymodal silanes or monopodal and polypodal silanes, wherein said monomodal silanes or said monopodal silanes have one silicon atom with two or three hydrolysable groups, said monomodal silanes or monopodal constitute from 15% to 85% of the total mass of the coating compositions combined solids and silanes, and said polymodal silanes or said monopodal silanes having at least two silicon atoms, each with two or three hydrolysable groups, said polymodal silanes or said polypodal silanes constitute from 15% to 85% of the total mass of the coating compositions combined solids and silanes.

Thereby the coating composition is furthermore advantageous over prior art or as such in ensuring good mechanical and chemical properties.

It is found that the combination of mono- and polymodal silanes or that the combination of mono- and polypodal silanes leads to an optimal compromise of the properties.

According to an embodiment of the coating composition, it is distinctive in that the said silanes comprise a polymodal silane or polypodal silane, where said polymodal silane or said polypodal silane comprises at least one urethane, thiourethane or urea linkage.

Thereby the coating composition is furthermore advantageous in ensuring weathering stability and/or good mechanical/chemical properties. This in comparison to ex. epoxies. Furthermore, the coating composition thereby remains flexible and scratch resistant.

The coating prepared by the coating composition thereby enhances the weathering stability properties of the coating by providing mechanical and chemical properties that ensure durability during weathering conditions.

By weather stable is understood improved weather stability as compared to those coatings prepared by use of epoxies.

According to an embodiment of the coating composition, it is distinctive in that the said silanes comprise a polymodal silane or polypodal silane, where said polymodal silane or polypodal silane comprises at least two linkages from the group of urethane, thiourethane or urea.

Another advantage is the usage of organic precursors that are cheaper than organosilanes.

It is thereby found that the coating composition is particular advantageous in ensuring weathering stability and/or good mechanical/chemical properties. Furthermore the coating composition thereby in particular remains flexible and scratch resistant.

In particular, the scratch resistance is due to the hydrogen bridges providing reorganisation of the deformed structures.

Further, the coating is adhesive on a variety of industrial structures of materials such as aluminium and stainless steel, but by no means limited to those materials.

Another way of achieving the objective according to the invention is by a cross-linkable coating composition comprising a combination of monopodal and polypodal silanes, wherein said monopodal silanes having one silicon atom with two or three hydrolysable groups, said monopodal silanes constituting from 15% to 85% of the total mass of the coating composition's combined solids and silanes, and said polypodal silanes having at least two silicon atoms, each with two or three hydrolysable groups, said polypodal silanes constituting from 15% to 85% of the total mass of the coating compositions combined solids and silanes.

Thereby providing a coating that when prepared by the coating composition has robust mechanical and chemical properties as disclosed and argued herein.

In particular this coating is adhesive to industrial structures of materials such as aluminium and stainless steel and provides corrosion protection.

According to an embodiment of the coating composition the said silanes comprise a polypodal silane, where said polypodal silane comprises at least one urethane, thiourethane or urea linkage.

Thereby further enhancing the coating as prepared by the coating composition to provide a coating that is weather stable and resistant to scratches.

According to an embodiment of the coating composition the said silanes comprise a polypodal silane, where said polypodal silane comprises at least two linkages from the group of urethane, thiourethane or urea.

Thereby the coating composition provides a particular advantageous coating with respect to scratch resistance. Furthermore, economic organic precursors such as isocyanates or polyols can be applied in the coating composition's synthesis.

According to an embodiment of the coating composition it is hydrolysed prior to application with a molar ratio of water to silicon-bonded hydrolysable groups of at least 0.1.

In this embodiment, the adhesion properties as previously outlined provides for the coating to adhere to structures.

According to an embodiment of the coating composition, the coating composition is hydrolysed prior to application with a molar ratio of water to silicon-bonded hydrolysable groups of at least 0.2.

In this preferred embodiment, the adhesion properties as previously outlined provide for the coating to adhere to structures and in particular to metallic structures.

According to an embodiment of the coating composition the coating composition is special in comprising a silane with one methyl group bonded to silicon and three hydrolysable groups, said silane constitutes at least 10% of the total mass of the coating composition's combined solids and silanes.

This will result in a coating that when prepared by the coating composition results in a coating that is stable and non-brittle. Furthermore, this will result in a coating that is flexible without sacrificing much hardness.

According to an embodiment, the coating composition when cured forms a coating on a structure with 4 to 44% by weight of silicon (Si) and 17 to 86% by weight of carbon (C).

Thereby the composition ensures a coating that comprises significant parts of both glass like structures and organic structures.

It is found that the percentage ranges of Silicon (Si) and Carbon (C) content result in a balanced stable coating that is not too brittle.

It is expected that a higher concentration of Silicon and a lower concentration of Carbon might lead to too brittle coatings, and thereby in the end in a less stable coatings.

It is expected that a lower concentration of Silicon might lead to a more or less organis coating which coating will not provide the same abrasion resistance and chemical stability.

Another way of achieving the objective according to the invention is by a crosslinkable coating composition prepared by a method or a process comprising at least one step of adding:
(i) one or more silanes comprising either of the following two options:
  at least three hydrolysable groups or
  at least two hydrolysable groups and at least one organofunctional group capable of forming chemical bonds upon curing, and
  (i.a) the sum of said silanes constituting at least 20% of the total mass of the coating compositions combined solids and silanes.
  (i.b) said silanes being possibly partly or completely hydrolysed and possibly partly condensed; and
(ii) at least one low surface energy additive defined by a surface providing a static water contact angle above 90°,
  (ii.a) said low surface energy additive comprising polydimethylsiloxane chemically bonded to at least one functional group,
  (ii.b) said functional group configuring the polydimethylsiloxane moiety to cross-link with said coating composition,
  (i.d) said polydimethylsiloxane moiety having a molecular weight of more than 1600 g/mol; and
curing the composition wherein the method comprises providing said polydimethylsiloxane at a concentration in the composition which, when said coating composition is cured, results in 0.01% to 15% of the mass of said cured coating.

As for the usage of polydimethysiloxane, the invention is understood as follows.

According to the present invention this problem is solved by a silane coating material comprising polydimethylsiloxane having a molecular weight of more than 1600 g/mol.

Said polydimethylsiloxane is, after the silane coating material is applied to form a cured coating film, chemically cross-linked with obtained coating film. Such polydimethylsiloxane constitutes 0.01% to 15% of the mass of such cured coating film.

In a preferred embodiment, the synthesis of such silane coating material comprises the step of reacting one molar part silanol terminated polydimethylsiloxane with an excess of at least three molar parts of a silane comprising at least two hydrolysable groups.

This way, a low surface additive is prepared without the use of costly monoalkoxysilanes. The excessive alkoxysilane is not separated but becomes part of said coating mixture.

In a further preferred embodiment, such silane comprises an aminogroup.

This way, an effective reaction between polydimethylsiloxane and silane can be provide without the need of a catalyst. In a further preferred embodiment said aminogroup is reacted to form an amide or a urea. Such enlarged terminal groups improve the compatibility of said polydimethylsiloxane component with the other components of said coating composition. As for the usage of silanes, the invention is understood as follows.

It is understood that a silane coating material according to the present invention comprises silanes with hydrolysable groups or silanol groups. Hydrolysable groups are bonded to silicon and can react with water, optionally in presence of a catalyst, to form silanol groups. Examples for such hydrolysable groups are halogens, especially chlorine, amino groups, acetoxy groups and alkoxy groups.

In a preferred embodiment, these hydrolysable groups are methoxy or ethoxy groups. By condensation of silanol groups with other silanol groups or with hydrolysable groups, a siloxane network is formed. Both hydrolysis and condensation reaction can occur during preparation of the coating material and during curing of the applied coating material.

As such this understanding guides or enables the person skilled in the art. This understanding is at the same time a basis for equivalent understandings or understandings that are derived from this understanding.

If such silane coating material according to the present invention is cured to form a coating film, such coating film comprises both a significant part of a siloxane network and a significant organic part. While the siloxane network provides hardness, chemical stability and adhesion to metallic and mineral substrates, the organic part provides flexibility such that the coating film according to the invention is an optimized compromise of the two extremes, a brittle inorganic glass-like structure and a solely organic, silane free coating. An optimized compromise can be defined by both the silane content of such coating material or the silicon and carbon content of such cured coating film.

A cured coating film prepared from the silane coating material according to the invention comprises between 4 to 44 mass % silicon, in a preferred embodiment between 6 to 42 mass % silicon and in an equally preferred embodiment between 8 to 40 mass %. Such cured film comprises on the other hand between 17 to 86 mass % carbon, in a preferred embodiment at between 23 to 82 mass % carbon and in a further preferred embodiment at between 30 to 79 mass % carbon.

Thereby the composition ensures a coating that comprises significant parts of both glass like structures and organic structures.

It is found that the percentage ranges of Silicon (Si) and Carbon (C) content result in a balanced stable coating that is not too brittle.

It is expected that a higher concentration of Silicon and a lower concentration of Carbon might lead to too brittle coatings, and thereby in the end in a less stable coatings.

It is expected that a lower concentration of Silicon might lead to a more or less organic coating which coating will not provide the same abrasion resistance and chemical stability.

As for the silane content, forming of a network and combined mass it is understood, that the content of silanes with at least three reactive groups such that they can become part of a three-dimensionally cross-linked network upon curing of such coating material, is at least 20 mass % of the combined mass of solids and silanes of such coating material. In a preferred embodiment, such silanes constitute at least 40% of the combind mass of solids and silanes.

The combined mass of solids and silanes covers all the coating compositions solids and all the coating compositions silanes, no matter whether these silanes are volatile like e.g. methyltriethoxysilane and partly evaporate after application of the coating.

The combined mass of solids and silanes covers as well reactive groups like e.g. ethoxy groups that may be split of and evaporate while curing such coating composition.

Silanes with at least three reactive groups are selected from the group of silanes comprising at least 2 hydrolysable groups and at least one further reactive group which may be a third hydrolysable group or an organofunctional group with the ability to crosslink upon curing of such coating material.

As for the kinds of silanes, the invention is understood as follows.

A coating composition according to the invention can provide different structures that contribute to the organic part of the cured coating film. Such structures can be any group bonded to a silane via a non-hydrolysable carbon silicon bond. Such group can be non-reactive, examples are alkyl or aryl groups. Such group can provide a further reactive group. Such group can also connect two or more silanes. Such organic structure can also be not bonded to a silane.

In a preferred embodiment, such not-silane bonded structures comprise reactive groups. Non-limiting examples for the reactive groups of both the silanes and the non-silane structures are epoxides, amines, isocyanates, (meth)acrylesters, vinyl-groups, thiols or anhydrides.

Specific embodiments of the invention consist in that one of the following silanes is used either as monomodal silane or monopodal silane or, if applicable, as precursor for the synthesis of a polymodal silane or polypodal silane:
Tetramethyl orthosilicate, Tetraethyl orthosilicate, Tetrapropyl orthosilicate, Tetraisopropyl orthosilicate, Tetrabutyl orthosilicate, Tetrakis (2-methoxyethyl)orthosilicate, Tetraacetoxysilane, Methyltriethoxysilane, Methyltrimethoxysilane, Methyltriacetoxysilane, Phenyltriethoxysilane, Phenyltrimethoxysilane, Propyltrimethoxysilane, Propyltriethoxysilane, n-Butyltrimethoxysilane, Isobutyltrimethoxysilane, Isobutyltriethoxysilane, n-Octyltriethoxysilane, Isooctyltrimethoxysilane, (3Aminopropyl)methyldiethoxysilane, (3-Aminopropyl)triethoxysilane, (3-Aminopropyl)trimethoxysilane, (3-Aminopropyl)silanetriol, N-(2-Aminoethyl)-3-aminopropyltrimethoxysilane, N-(2-Aminoethyl)-3-aminopropyltriethoxysilane, N-(2-Aminoethyl)-3-aminopropylmethyldimethoxysilane, N-(2-Aminoethyl)-3-aminopropyl-silanetriol, (3-Trimethoxysilylpropyl)diethylenetriamine, n-Butylaminopropyltrimethoxysilane, n-Methylaminopropyltrimethoxysilane, (N-Cyclohexylaminomethyl)triethoxysilane, (N-Cyclohexylaminomethyl)methyldiethoxysilane, (N-Phenylaminomethyl)trimethoxysilane, (N-Phenylaminomethyl)methyldimethoxysilan, Bis(2-hydroxyethyl)-3-aminopropyltriethoxysilane, 3-Mercaptopropylmethyldimethoxysilane, 3-Mercaptopropyltrimethoxysilane, 3-Mercaptopropyltriethoxysilane, (3-Glycidoxypropyl)methyldimethoxysilane, (3-Glycidoxypropyl)trimethoxysilane, (3-Glycidoxypropyl)triethoxysilane, 3-Methacryloxypropyltrimethoxysilane, (Methacryloxymethyl)trimethoxysilane, (Methacryloxymethyl)methyldimethoxysilane, (Methacryloxymethyl)triethoxysilane, (Methacryloxymethyl)methyldiethoxysilane, Vinyltrimethoxysilane, Vinyltriethoxysilane, Vinyltris(2-methoxyethoxy)silane, (3-Triethoxysilyl)propylsuccinic anhydride, (3-Isocyanatopropyl)triethoxysilane, (3-Isocyanatopropyl)trimethoxysilane, (Isocyanatomethyl)methyldimethoxysilane, (Isocyanatomethyl)trimethoxysilane, 3-(Triethoxysilyl)propionitrile, Methyl-[N-(dimethoxymethyl)silylmethyl] carbamate, Ureidopropyltrimethoxysilane, 3-(Trihydroxysilyl)propyl methylphosphonate.

According to embodiments of the invention, a catalyst is used to catalyze hydrolysis or curing reaction, such catalyst being preferably chosen from the group of Brønsted acids, Lewis acids including salts, metal alkoxides and metal complexes, bases, tin complexes. In a further preferred embodiment of the invention this catalyst is a Brønsted acid or a complex or alkoxide of Al, Ti or Zr.

As for the usage of methylsilane, the invention is understood as follows.

In another preferred embodiment, such silane coating system contains at least 10% methylsilanes based on the combined mass of solids and silanes, such methylsilanes providing three hydrolysable groups.

Examples for such silanes are methyltriethoxysilane and methyltrimethoxysilane. Such silanes are the simplest organic modification of an inorganic $SiO_2$ network and provide within a cured coating film flexibility without sacrificing too much hardness compared to silanes comprising bigger organic groups.

As for the usage of polypodal silanes, the invention is understood as follows.

In a preferred embodiment, such silane coating material comprises a polypodal silanes.

A polypodal silane is a molecule or polymer comprising more than one silicon atom, said silicon atoms connected by a non hydrolysable link or network. The simplest form of a polypodal silane is a dipodal silane. According to the invention, these silicon atoms provide hydrolysable groups. Accordingly, by a monopodal silane is meant a silane comprising one silicon atom.

Such polypodal silanes give access to structures that are difficult to form during the curing process of such coating compositions due to the high reactivity of the required precursors or due to unwanted side reactions with alcohol or water.

In a preferred embodiment, such polypodal silanes constitute at least 5% of the coating compositions combined mass of solids and silanes.

In another preferred embodiment, these structures comprise urethane, thiourethane or urea groups. Such groups are well known from organic coatings being weathering stable and providing flexibility while still maintaining scratch resistance due to hydrogen bridges that can provide a re-organization of the deformed structure.

In a further preferred embodiment, these structures comprise at least two urethane, thiourethane or urea groups. These structures can be prepared using organic precursors such as e.g. organic isocyanates or organic polyol resins.

In a further preferred embodiment, such coating systems comprise at least 15% polypodal silanes and at least 15% monopodal silanes based on mass of combined solids and silanes of such coating system. This combination can overcome the disadvantage of the use of solely higher molecular weight di- and polypodal silanes that comprise a lower density of reaction possibilities to the substrate surface, which may result in lower adhesion.

As for hydrolysis or the process of hydrolysis, the invention is understood as follows.

In a further preferred embodiment, such silane coating system may be hydrolysed with water and optionally one or more catalysts prior to application. In a preferred embodiment such coating system is hydrolysed with at least 0.1 mol water per 1 mol hydrolys able groups bonded to silicon.

In a further preferred embodiment such coating system is hydrolysed with at least 0.2 mol water per 1 mol hydrolysable groups bonded to silicon. Hydrolysis leads to reactive silanol groups providing adhesion to metallic surfaces. Hydrolysis is to some extent followed by precondensation of the silanes. Precondensation makes it possible to apply volatile silanes that otherwise would almost completely evaporate during the curing process.

In a further embodiment, both kind and amount of catalyst and amount of water are optimized for a fast hydrolysis reaction leading to a low process time.

In another embodiment, both kind and amount of catalyst and amount of water used for hydrolysis are optimized to obtain a long pot-life of such hydrolysed coating system, said pot-life being more than 36 h, further preferred more than 5 days and even further preferred greater one month.

According to an embodiment of the invention, a coating consists of the coating composition as described wherein said repellent coating composition further is added any or any combination of additives such as a binder, a hardener, a colorant, a filler, a catalyst, a UV-stabilizer, a solvent, a rheological modifier, a flow/levelling/wetting agent, or an anti-bacterial agent.

Thereby a repellent coating is made for use in particular environments specifically matched by the inferred functional meanings.

According to a particular embodiment of the coating, the rheological modifier is fumed silica.

Thereby, the coating provides thixotropic properties reducing the formation of runs on application, which results in a more uniform coating.

According to a particular embodiment of the coating, the flow/levelling/wetting agent is a fluorosurfactant.

Thereby, the coating provides improved surface wetting.

According to a particular embodiment of the coating, any kind of additive may comprise polydimethylsiloxane having a lower molecular weight than 1600 g/mol in addition to said polydimethylsiloxane having a molecular weight above 1600 g/mol for different uses including the use as a wetting agent.

According to a particular embodiment of the coating, either the binder or the hardener additive is a cross-linkable organic resin, such as e.g. an epoxide, an isocyanate or an amine.

Thereby, the coating is particularly suited for application as a 2-component system, possibly curing at room temperature.

According to a particular embodiment of the coating, the colorant additive is a pigment, which pigment is organic or inorganic or which colorant additive is a dye, or which colorant additive is any other form of a colorant.

Thereby the coating is particularly suited for matching, blending in, the structure in a given environment.

According to a particular embodiment of the coating, the filler additive is layered silica.

Thereby, the coatings' corrosion protection can be further improved.

According to a particular embodiment of the coating, the catalyst additive is an acid such as any Brønsted acid, a Lewis acid such as an alkoxides, a complex of Al, Ti and Zr, or a combination thereof.

Thereby, hydrolysis and condensation of the silanes is catalyzed improving the coatings' cross-linking and thus the coatings' mechanical and chemical resistance.

According to a particular embodiment of the coating, the UV-stabilizer additive is an organic UV absorber, e.g. a Benzotriazole derivate or an inorganic UV absorber such as Zinc oxide or Cerium oxide nanoparticles, possibly in combination with a radical scavenger such as a hindered amine light stabilizer (HALS).

Thereby, the coating is particularly suited for use on a surface of a structure that is exposed to light with radiation in the UV-wavelength region, such as sunlight, and the coating and/or the structure will maintain the structural and/or repellent properties longer in such environment.

According to a particular embodiment of the coating, the solvent additive is an alcohol, a ketone, an ester, an ether or a volatile silane.

Thereby adjusting the coating compositions viscosity, keeping the coating's components in solution and aiding film formation by providing low surface tension, flow and levelling. Furthermore, the coating is particular suited to be applied as a thin film.

According to a particular embodiment of the coating, the anti-bacterial agent additive is inorganic nanoparticles such as zinc oxide or silver.

Thereby, the coating is particularly suited for use on a surface of a structure that is exposed to living organisms that will attach and accumulate over time. One particular case is generally known as bio-fouling.

According to an objective of the invention, the use of a coating consisting of a coating composition or a coating composition as prepared by the previous description yields an improved repellent surface of structures as will be described in the following.

According to an embodiment of the invention, an advantageous use of said coating, coating composition is on at least part of a surface of a structure to protect said structure from oil or oil derived fouling to repel said oil or said fouling from the surface of the structure.

According to an embodiment, a surface providing a low surface energy is provided on a structure, where said structure is used to handle crude oil.

This is of particular importance in relation to structures in contact with crude oil as theses structures typically are used offshore. Maintenance costs and efforts required to maintain offshore structures are often extreme and complicated by the need of helicopters to transport the structures and divers to maintain and install the structures. Therefore, even the slightest improvement in repellent properties to avoid said fouling will extend the time before any form of maintenance is needed.

A structure with a coating prepared by a coating composition according to this disclosure will provide such repellent surface that will extend the time needed before maintenance.

Furthermore, these offshore structures are often metal surfaces such as steel, stainless steel, aluminium or titanium.

A structure with a coating prepared by the coating composition according to this disclosure will adhere strong enough to such offshore structures.

A structure with a coating prepared by the coating composition according to this disclosure will be both mechanically and chemically be sufficiently robust to ensure that the repellent properties are maintained in the offshore environment or when exposed to warm crude oil.

In combination it has surprisingly been observed that a coating as prepared by a coating composition that is silane based as disclosed provides a repellent surface that prevents fouling and at the same time is strong enough to maintain chemical attacks from crude oil.

By having a structure with a low surface energy, a structure is provided that will repel crude oil or crude oil derived fouling.

According to an embodiment of the invention, an advantageous use of said coating, coating composition is on at least part of a surface of a structure to protect said structure from crude oil or crude oil derived fouling to repel said crude oil or said fouling from the surface of the structure.

The term crude refers to all process stages until the specific oil fractions have been separated by distillation and includes mixtures like. e. g. water contaminated by crude oil. Crude oil fouling is a very specific technical challenge by consisting of a complex mixture of organic compositions such as waxes, fats, tar, greases, or equivalents or inorganic compositions such as limestone or sulphates of calcium, strontium or barium, or equivalents.

In particular, it has been found that the repellent features and durability or stability of the coating is advantageous in repelling and handling such as cleaning said organic compositions and/or inorganic compositions.

According to an embodiment of the invention, an advantageous use of said coating or coating composition is on at least part of a surface of a structure to protect said structure from gas including natural gas and gas derived fouling to repel said gas or said fouling from the surface of the structure.

Likewise, the coating is advantageous in repelling and handling mixtures of organic and inorganic compositions in gas including natural gas before, during and after industrial processing such as refinery.

According to an embodiment of the invention, an advantageous use of said coating, coating composition is to reduce or repel material accumulation on or to remove accumulated material from surfaces of structures, where said accumulation of material can be due to fouling, scaling, corrosion or alike.

According to an embodiment of the invention, an advantageous use of said coating, coating composition is to prevent or reduce accumulation of material on or to repel material from structures used in maritime or off-shore environments.

According to an embodiment of the invention, an advantageous use of said coating, coating composition is to prevent or reduce accumulation of material on or to repel material from structures used in energy converters such as power plants, where said energy converters include turbines, blades on wind turbines and solar converters, and alike being submerged.

According to an embodiment of the invention, an advantageous use of said coating, coating composition is to prevent or reduce accumulation of material on or to repel material from structures used in heat exchangers.

According to an embodiment of the invention, an advantageous use of said coating, coating composition is to prevent or reduce accumulation of material on or to repel material from on structures used in pipes, tubes, channels or valves. Non-limiting examples for such structures are hydrocyclones or centrifuges.

According to an objective of the invention, the use of a coating consisting of a coating composition or a coating composition as prepared by the previous description is implied by applying said coating or coating composition to a structure by a method, which is by spraying the anti-fouling composition or coating thereof onto at least part of said structure.

By use of this particular method it is possible to obtain a very homogenous coating film on most surfaces.

According to an objective of the invention, the use of a coating consisting of a coating composition or a coating composition as prepared by the previous description is implied by applying said coating or coating composition to a structure by a method, which is by dipping at least part of said structures in the coating composition or coating thereof.

This method is particularly useful to coat structures with cavities that are otherwise difficult to coat.

According to an objective of the invention, the use of a coating consisting of a coating composition or a coating composition as prepared by the previous description is implied by applying said coating or coating composition to a structure by a method, which is by flow-coating the coating composition or coating thereof onto at least part of said structure.

By use of this particular method pipe-like structures can be coated on the in- and outside without the need of excess material to fill the whole pipe as necessary for dipcoating.

According to an objective of the invention, the use of a coating consisting of a coating composition or a coating composition as prepared by the previous description is implied by applying said coating or coating composition to a structure by a method, which is by brush-painting the coating composition or coating thereof onto at least part of said structure.

By use of this particular method it is easy to repair defects or coat small series without any special equipment.

SHORT DESCRIPTION OF THE DRAWINGS

The invention will be explained in more detail with reference to the pictures, where picture 1 shows the results of different marker tests, picture 2 shows a heat exchanger plate coated according to example 1 after draining the crude oil, the ellipse indicates the area cleaned with a tissue, picture 3 shows a heat exchanger plate coated according to example 1 after pressure washing, and picture 4 shows an un-coated heat exchanger plate after draining the crude oil, the ellipse indicates the area cleaned with a tissue.

An allocation of the photos of picture 1 is provided in table 2. For scale purposes: The width of the marker line in picture 1 is about 2 mm, the spacing of the heat exchangers' wash board pattern in pictures 2-4 is about 18 mm.

DETAILED DESCRIPTION AND
EXPERIMENTAL PROCEDURES

In the following the invention is described in more details by particular embodiments and examples.

Examples 1 to 5 are according to the invention, whereof 1 and 5 illustrate good repellent properties according to the invention as compared to examples 2, 3, and 4 that illustrate coatings with repellent properties.

All examples 1 to 5 illustrate the preferred embodiment of combining mono- and polymodal silanes or mono- and polypodal silanes as compared to examples 6, 7, and 8.

Abbreviations

In the detailed description, the examples and embodiments, the following abbreviations are used. It is understood that a person skilled in the art is familiar with at least some of the abbreviations or that the person skilled in the art is capable of seeking inspiration in chemicals listed and their particular derivatives characterized by ex. specific properties such as viscosity.

AMDES: (3-Aminopropyl)methyldiethoxysilane
PDMS-1: Polydimethylsiloxane, silanol terminated, viscosity 16-32 cSt. MW: 400-700 g/mol (from ABCR)
PDMS-2: Polydimethylsiloxane, silanol terminated, viscosity 35-45 cSt. MW: 700-1500 g/mol (from ABCR)
PDMS-3: Polydimethylsiloxane, silanol terminated, viscosity 45-85 cSt., MW: 2000-3500 g/mol (from ABCR)
H12MDI: 4,4'-Methylenebis(cyclohexylisocyanate)
D'N3400: Desmodur N 3400 from BayerMaterialscience, NCO-equivalent mass: 193 g/mol, average functionality ~2.5 (a composition based on a polymer of 1,6-hexamethylene diisocyanate)
MTES: Methyltriethoxysilane
TEOS: Tetraethyl orthosilicate
MIBK: 4-Methyl-2-pentanone (Methylisobutylketone)
Ti-EA: Diisopropoxy-bis(ethylacetoacetato)titanate
Byk 306: Levelling agent, Byk 306 from Byk Chemie General Procedure Storage Stable Coating Composition Examples 1-4

AMDES was placed in a bottle. If silanol terminated polydimethylsiloxane was used, it was added to AMDES while stiffing and stirring was continued for 15 h at room temperature to allow reaction of the silanol groups with AMDES' alkoxygroups. Otherwise, this step was skipped. Then Ethanol, 2-Propanol and MTES were added. While stiffing, H12MDI was added, stirring was continued for 30 min without any external heating. H12MDI reacts with the aminosilane to form urea groups.

According to the molar amounts of H12MDI and AMDES provided in table 1, the main product formed is a polypodal silane according to structure 1.

The pH-value was checked by placing a drop of the solution on a wet indicator paper. Neutral reaction indicated that all amine had reacted, otherwise, additional H12MDI was added.

It is understood that when mixing AMDES and H12MDI in the coating composition, then ADMES and H12MDI react with each other and form a new component and then the coating composition is free of ADMES and H12MDI, but instead contains the new component.

Storage Stable Coating Composition

Example 5

AMDES was placed in a bottle, PDMS-3 was added while stirring and stirring was continued for 15 h at room temperature. Then, 40% of the total amount of Ethanol were added. While stirring, a solution of D'N3400 in 2-Propanol and Ethylacetate was added, stiffing was continued for 30 min without any external heating. The pH-value was checked by placing a drop of the solution on a wet indicator paper. Neutral reaction indicated that all amine had reacted. Then, the remaining Ethanol and MTES were added.

Hydrolyzed Coating Composition Examples 1-5

For hydrolysis, phosphoric acid was added to the storage stable coating composition while stiffing, stiffing was continued for 15 h at room temperature. The hydrolyzed solutions were applied within 2 days.

It is understood by a person skilled in the art that the coating composition can be made according to the disclosure herein and that the examples can be modified within the scope of this invention.

In particular it is understood that said polymodal or polypodal silane is formed by a reaction between either H12MDI and AMDES or D'N3400 and AMDES. Likewise, an even larger molecule also being a polypodal silane is formed from AMDES, PDMS-3 and H12MDI.

Such reactions or intermediate reactions will be clear from the examples and tables that follow.

Application:

The hydrolyzed solutions were applied to both aluminum panels and type 304 stainless steel panels with a wire wound rod supposed to give 75 μm wet film thickness. After 5 min flash-off, the samples were cured 1 h at 200° C. Clear coatings were obtained.

Structure 1

TABLE 1

Composition examples 1-5.

| | Example: | | | | |
|---|---|---|---|---|---|
| | 1 | 2 | 3 | 4 | 5 |
| Storage stable coating compositions | | | | | |
| PDMS-1 | — | — | 2.01 g | — | — |
| PDMS-2 | — | — | — | 2.01 g | — |
| PDMS-3 | 1.07 g | — | — | — | 0.72 g |
| AMDES*) | 19.61 g (0.102 mol) | 19.82 g (0.104 mol) | 19.12 g (0.100 mol) | 19.11 g (0.100 mol) | 13.26 g (0.0690 mol) |
| H12MDI*) | 13.45 g (0.0513 mol) | 13.60 g (0.0518 mol) | 13.09 g (0.0499 mol) | 13.09 g (0.0499 mol) | — |
| D'N3400*) | — | — | — | — | 13.86 g (0.0718 mol NCO groups) |
| MTES | 65.87 g (0.369 mol) | 66.58 g (0.373 mol) | 65.78 g (0.369 mol) | 65.79 g (0.369 mol) | 72.16 g (0.405 mol) |
| Combined sum of solids and silanes | 100.00 g | 100.00 g | 100.00 g | 100.00 g | 100.00 g |
| Ethanol | 39.48 g | 39.90 g | 43.68 g | 43.68 g | 95.59 g |
| 2-Propanol | 14.82 g | 14.98 g | 14.61 g | 14.60 | 15.32 g |
| Ethylacetate | — | — | — | — | 23.25 g |
| Hydrolyzed coating compositions | | | | | |
| 0.7% phosphoric acid | 9.95 g (0.549 mol water) | 9.99 g (0.551 mol water) | 10.21 g (0.563 mol water) | 10.21 g (0.563 mol water) | — |
| 0.2% phosphoric acid | — | — | — | — | 8.80 g (0.486 mol water) |

*)Both H12MDI or D'N3400 react with AMDES to the respective polypodal silanes.

Adhesion Test

Adhesion was checked by performing and rating a cross cut/tape test according to ISO 2409. The marks 0 and 1 are regarded as sufficient adhesion, the marks 3, 4 and 5 are regarded as insufficient adhesion. After collecting the dry adhesion results, the samples with the cross cut were submitted for 24 h in demineralised water at room temperature. The tape test was performed again and rated to obtain wet adhesion results.

Examples 1 to 4 were tested on both Aluminium alloy 3003H14 and type 304 stainless steel cleaned solely with an acetone soaked tissue prior to the application of the coating. Example 5 was tested solely on aluminium. In each case, both dry and wet adhesion is 0.

The effect of this is that good adhesion is achieved.

As such the coating adheres to the structure it is applied to even when in the respective environments.

Marker Test

The repellent properties were investigated by a permanent marker test. A line was drawn with a black Stabilo OHPen size M marker. It was checked whether there was a beading effect indicating low surface tension or whether the marker wetted the surface completely. After 2 min drying it was tried to wipe the marker line away with a dry paper tissue by hand. If not possible, the marker was removed with an acetone soaked tissue. The samples were checked whether a visible grey or black trace was left after removing the marker indicating the marker ink to have penetrated into the coating.

To check the stability of the repellent properties the samples were wiped with an acetone soaked cloth for 30 s and the marker test was repeated for a second time.

TABLE 2

Summary of the marker test.

| | Example | | | | | | | |
|---|---|---|---|---|---|---|---|---|
| | 1 and 5 | | 2 | | 3 | | 4 | |
| | 1st time | 2nd time | 1st time | 2nd time | 1st time | 2nd time | 1st time | 2nd time |
| Beading effect | good | good | none | none | none | none | partly | minimal |
| Dry marker removal | possible | possible | not possible | not possible | partly possible | not possible | possible | possible |
| Trace left after removal | none | none | none | none | none | none | none | none |

The marker test is illustrated in picture 1. Allocation of the photos in picture 1: "A" refers to example 2, "B" refers to example 4, "C" refers to example 1. "1" refers to the drawn marker line, "2" refers to the line after dry removal, "3" refers to the line after acetone removal. "4", "5" and "6" refer to the same steps as "1", "2" and "3" respectively, just that this is the repetition of the test after acetone wiping.

The marker is a simple and reproducible example of fouling and a chemical attack to the surface.

The effect achieved by the coating as prepared by the coating composition according to the invention is that the marker does not wet the surface i.e. the marker does not form a continuous film, which indicates that the coated surface is low adhesive.

The low adhesive properties are also indicated by the fact that the marker can easily be wiped away with a dry tissue.

No shadow is left in the coating after wiping, which indicates that the ink in the marker does not penetrate the coating.

The repetition of the test after wiping the surface with an acetone soaked cloth is an example of a combined chemical and mechanical attack. The test is also repeated after the scratch test, see below, as an example of an additional mechanical attack.

As such the coating prevents that material adheres to the coated surface and this avoids fouling. Furthermore, the coating prevents that material adheres to the coated surface even after chemical and mechanical attacks.

Surface Energy

Static contact angles were measured for both water and diiodomethane after the surfaces had been submitted to acetone wiping as described for the marker test. The drop size was about 10 μl. The average of 5 measurements is shown. The surface energies were calculated applying Fowkes' method.

TABLE 3

Surface characteristics.

|  | Example 1: | Example 2: | Example 4: |
| --- | --- | --- | --- |
| Water contact angle | 104 ± 1° | 84 ± 2° | 97 ± 2° |
| Diodomethane contact angle | 76 ± 1° | 52 ± 2° | 66 ± 3° |
| Total surface energy | 20 mN/m | 34 mN/m | 25 mN/m |
| Disperse surface energy | 19 mN/m | 30 mN/m | 24 mN/m |
| Polar surface energy | 1 mN/m | 3 mN/m | 1 mN/m |

The effect of the coating as prepared by the coating composition according to the invent is that the surface energy as measured by the contact angle shows a higher angle and thus a lower surface tension, which is advantageous as it indicates a low adhesion force.

Hence material does not adhere to the coated surface and a coated surface according to the invention avoids fouling.

Scratch Test

A 500 g steel cylinder being 20 mm in diameter was on one end equipped with a 000-steel wool pad. The cylinder was placed with the steel wool facing down on an aluminum plate spray-coated according to example 1, the dry film thickness being about 15 μm. The cylinder was moved back and forth over the sample in 10 double hubs by hand without applying additional pressure and without lifting the cylinder. The calculated pressure on the sample is about 15 kPa. After the test, no scratches were visible on the coated surface and the repellent properties as checked by the marker test described above were not changed.

The coating as prepared by the coating composition according to the invention has the effect that the repellent properties are not diminished by mechanical attacks. This is observed by repeating the above marker test.

As such the coating is resistant to mechanical attacks that would otherwise result in scratches or wear.

Weathering Stability

Aluminum panels coated according to examples 2 and 4 were submitted for 1000 h to a QUV-A test according to ISO 4289-3 driven by alternating 4 h UV radiation at 60° C. using UVA-340 bulbs followed by 4 h condensation at 50° C. After the test, the coatings showed no visible changes.

As such the coating as prepared by the coating composition as disclosed is not attacked by an outdoor atmosphere or outdoor conditions including sun light.

Application on Heat Exchanger Plates

After investigation of the coatings' properties in small scale laboratory settings, the coatings' performances were tested in larger scale field tests where transport and cleaning is costly.

The large scale field test was conducted on Titanium heat exchanger plates in the size of about 0.6×1.8 m. The heat exchanger plates have been in use in contact with crude oil for several years.

Due to fouling of both organic and inorganic material with a wax-like consistency on the oil side of the heat exchanger constraining the oil flow and reducing the heat transfer, the exchanger has to be dismantled and the plates have to be transported on-shore after several months in use to be cleaned in a procedure including dipping in liquid nitrogen and cleaning steps with acidic and alkaline cleaners and pressurized water.

The hydrolyzed coating composition according to example 1 was diluted with 28 g MIBK based on 100 g hydrolyzed solution and applied by spraying to both sides of 15 plates which had been cleaned before by the cleaning procedure mentioned above. The coating was cured 1 h at 200° C. to form a 2-4 μm thick film. The plate heat exchanger consisted of a total of 349 parallel plates. The coated plates have been mounted in three groups of five consecutive plates at different places in the heat exchanger; the other plates were not coated. When in use, the plates are clamped together with gaskets in between. Mounted on an off-shore platform, crude oil is cooled from about 50° C. to about 40° C. using seawater, so there is alternating water and oil flowing through the cavities between the plates.

The test heat exchanger was put into test during real conditions of operation on a Danish North Sea oil platform.

After four months of operation, the heat exchanger was pre-inspected by thermoimaging from the side, i.e. from the edges of the plates. The coated plates are about 2-3 K warmer than the uncoated plates indicating a higher flow of the warm crude oil compared to the uncoated plates.

After 32 weeks, the pressure drop on the oil side was so high that the heat exchanger plates had to be brought on-shore. Oil and water were let to drip down. The coated plates appeared to be significantly less dirty to the observer. The fouling on five coated and five uncoated plates from the same region of the heat exchanger was measured by weighing being 590±130 g on the uncoated plates and 200±50 g on the coated plates. This means a fouling reduction of about 60-70% by application of the coating.

Virtually complete removal of the fouling was possible on the coated plates both with a dry tissue by hand or with pressurized water. On the uncoated plates, these methods remove only a limited amount of fouling. Pressure washing showed also that the repellent effect of the coated surface was still intact as water drops showed a beading effect.

The described effects are illustrated in pictures 2, 3, and 4.

The coating as prepared by the coating composition according to the invention in a specific representative application shows durability or robustness and at the same time sufficient repellent properties to limit fouling.

As such the warm crude oil is an example of chemical and mechanical attacks discussed in the previous tests.

The coating is stable and maintains its repellent properties over a long period contact with warm crude oil.

Examples 6, 7 and 8

Examples 6, 7 and 8 are not inventive as they neither comprise a polydimethyl siloxane component and thus do not provide a repellent surface, nor comprise a combination of mono- and polypodal silanes. However, the advantage of the combination of mono- and polymodal or mono- and polypodal silanes according to examples 1 to 5 have a significant better adhesion and corrosion resistance compared to the examples 6, 7 and 8.

Example 6 is formulated according to a brochure from Evonik solely based on monomodal silanes or monopodal silanes and applied as recommended at lower layer thickness due to its brittleness. Examples 7 and 8 are solely based on polymodal silanes or polypodal silanes with example 8 not being hydrolyzed but cured solely by atmospheric moisture with help of a Titanium catalyst.

Example 6 was prepared solely by mixing all ingredients except phosphoric acid and then being hydrolyzed like examples 1-4.

Example 7 and 8 were prepared as described for examples 1-4, MIBK and Byk 306 were added as the last step of the synthesis, after hydrolysis if applicable. The coating solutions were applied by spraying without further dilution except example 2 being diluted with 28 g MIBK per 100 g hydrolyzed coating composition.

The coatings were cured as described for examples 1-4. In all cases clear coatings were obtained.

Aluminum alloy 3003H14 plates from Q-lab, 126×76 mm, were used as substrates, the adhesion was investigated as described above.

TABLE 4

Composition of examples 6-8.

|  | Example 6 | Example 7 | Example 8 |
|---|---|---|---|
| AMDES*) | — | 59.32 g (0.310 mol) | 57.84 g (0.302 mol) |
| H12MDI*) | — | 40.68 g (0.155 mol) | 39.67 g (0.151 mol) |
| TEOS | 14.29 g (0.0686 mol) | — | — |
| MTES | 85.71 g (0.481 mol) | — | — |
| Ti-EA | — | — | 2.50 g (0.055 mmol) |
| Combined sum of solids and silanes | 100.00 g | 100.00 g | 100.01 g |
| Ethanol | 21.43 g | 216.11 g | 116.43 g |
| 2-Propanol | 8.57 g | 44.83 g | 43.71 g |
| MIBK | — | 152.44 g | 85.00 g |
| Byk 306 | — | 0.24 g | — |
| 0.7% phosphoric acid | 12.97 g (0.717 mol water) | 4.47 g (0.247 mol water) | no hydrolyzation |

*)H12MDI and AMDES react to form a polypodalsilane according to structure 1 as main product.

Salt Spray Test:

7 Specimen per coating and per kind of substrate cleaning were submitted to 1000 h salt-spray test according to ISO 9227 on a Q-fog 600 device using neutral 5% NaCl solution and continuous spraying with 24-48 mm/day. Before testing, a cross was scratched into sample surface. After running the test, the kind of corrosion was investigated by microscope and the visibly corroded area in percentage of the total substrate area was estimated. If not stated otherwise, the corrosion occurred as flat spots between coating and substrate, neither being filiform corrosion from the cuts, nor being pitting corrosion reaching deeper into the substrate.

TABLE 5

Results for Al-panels cleaned by wiping with an acetone soaked tissue prior to application of the coating.

|  | Example 2 | Example 6 | Example 7 | Example 8 |
|---|---|---|---|---|
| Dry film thickness | 6-10 μm | 1 μm | 6-10 μm | 7-17 μm |
| Dry adhesion | 0 | 0 | 0 | 0 |
| Wet adhesion | 0 | 0 | 3 | 5 |
| Salt-spray test: |  |  |  |  |
| Corroded area | 0.5 ± 0.1% | 4 ± 1% | 13 ± 1% | 19 ± 7% |
| Filiform corrosion | no | no | yes | yes |
| Pitting corrosion | no | no | no | no |

TABLE 6

Results for Al-panels cleaned 3 min in an ultrasonic bath in a mild alkaline cleaner (5% solution of Eskaphor AE 6044 from Haug Chemie) at 70° C., rinsed with water and oven-dried at 95° C. prior to application of the coating. Dry film thicknesses as for the acetone cleaned samples.

|  | Example 2 | Example 6 | Example 7 | Example 8 |
|---|---|---|---|---|
| Dry adhesion | 0 | 0 | 0 | 0 |
| Wet adhesion | 0 | 0 | 0 | 0 |
| Salt-spray test: |  |  |  |  |
| Corroded area | none | 0.10 ± 0.01% | 0.01 ± 0.01% | 0.02 ± 0.03% |
| Filiform corrosion | no | no | no | no |
| Pitting corrosion | no | yes | no | no |

The effect of the coating as prepared by the coating composition in an aggressive environment simulated by the salt-spray is that the coating protects against the aggressive environment and prevents for example corrosion. A further effect is that the coating can adhere to the structure when applied in the aggressive environment.

As such the coating protects and adheres to the structure in an aggressive environment and prevents for example corrosion.

The invention claimed is:

1. A cross-linkable coating composition comprising:
   (i) methyltriethoxysilane,
   (ii) a polysilane obtainable by reacting (3-aminopropyl) methyldiethoxysilane with a further component selected from the group consisting of 4,4'-methylene bis(cyclohexylisocyanate) and a homopolymer of 1,6-hexamethylene diisocyanate, and where the sum of said silanes constitutes at least 20% of the total mass of the coating composition's combined solids and silanes, and where said silanes are optionally partly or completely hydrolysed and optionally partly condensed; and
   (iii) at least one low surface energy additive defined by a surface providing a static water contact angle above 90°, wherein (iii.a) the low surface energy additive is obtainable by reacting (3-aminopropyl) methyldiethoxysilane with a silanol terminated polydimethylsiloxane and a further component selected from the group consisting of 4,4'-methylene bis(cyclohexylisocyanate) in the presence of ethanol and 2-propanol as solvents or a composition comprising a homopolymer of 1,6-hexamethylene diisocyanate in the presence of ethanol, ethylacetate and 2-propanol as solvents, (iii.b) said polydimethylsiloxane has in the composition a concentration that upon curing results in 0.01% to 15% of the mass of said cured coating, and (iii.c) said polydimethylsiloxane moiety has a molecular weight of more than 1600 g/mol.

2. Method of making a cross-linkable coating composition comprising:

(i) one or more silanes comprising either of the following two options:

at least three hydrolysable groups or at least two hydrolysable groups and at least one organofunctional group capable of forming chemical bonds upon curing, and where the sum of said silanes constitutes at least 20% of the total mass of the coating compositions combined solids and silanes, where said silanes being optionally partly or completely hydrolysed and optionally partly condensed; and (ii) at least one low surface energy additive defined by a surface providing a static water contact angle above 90°, (ii.a) said low surface energy additive comprising polydimethylsiloxane chemically bonded to at least one functional group, (ii.b) said functional group configuring the polydimethylsiloxane moiety to cross-link with said coating composition, and curing the composition wherein the method comprises the step of obtaining at least one low surface energy additive by reacting 1 molar part silanol terminated polydimethylsiloxane with an excess of at least 3 molar parts of a silane having at least two hydrolysable groups and at least one amino-group, said amino group being in a further step converted to an urea or an amide group, and where said polydimethylsiloxane moiety has a molecular weight of more than 1600 g/mol, and where the method comprises providing said polydimethylsiloxane in a concentration in the composition which, when said coating composition is cured, results in 0.01% to 15% of the mass of said cured coating.

3. Method of making a coating composition according to claim 2, wherein said method contains at least one step during preparation that adjusts the amount of silicon (Si) and carbon (C) being added to ensure that said coating composition, when cured, has a silicon (Si) content between 4% and 44% and a carbon (C) content between 17% and 86% by weight.

4. Method of making a coating composition according to claim 2 wherein the method comprises the usage of a silane with one methyl group bonded to silicon and three hydrolysable groups, said silane constitutes at least 10% of the total mass of the coating compositions combined solids and silanes.

5. Method of making a coating composition according to claim 2 wherein at least 5% of the total mass of the coating compositions combined solids and silanes is a silane obtainable by reacting (3-aminopropyl)methyldiethoxysilane with a further component selected from the group consisting of 4,4'-methylene bis(cyclohexylisocyanate) in the presence of ethanol and 2-propanol as solvents and a homopolymer of 1,6-hexamethylene diisocyanate in the presence of ethanol, ethylacetate and 2-propanol as solvents.

6. Method of making a coating composition according to claim 2 comprising at least one step of adding a combination of monopodal silanes and polysilanes, wherein said monopodal silanes have one silicon atom with two or three hydrolysable groups, said monopodal silanes constitute about 15% to 85% of the total mass of the coating compositions combined solids and silanes and said polysilanes having at least two silicon atoms, each with two or three hydrolysable groups, and an organic structure connecting the silicon atoms through a silicon-carbon bond and where said polysilane comprises at least one group of thiourethane or urea linkage and where said polysilanes constitute about 15% to 85% of the total mass of the coating compositions combined solids and silanes.

7. Method of making a coating composition according to claim 2, comprising hydrolysing the coating compositions prior to application.

8. Method of making a coating composition according to claim 7 including a step where the hydrolysis is performed prior to application with a molar ratio of water to silicon-bonded hydrolysable groups of at least 0.1.

9. Method of making a coating composition according to claim 2 where the hydrolysis of the coating composition is performed prior to application with a molar ratio of water to hydrolysable groups bonded to silicon of at least 0.2.

10. Method of making a coating composition according to claim 2 including a step of providing a polysilane, where said polysilane comprises at least one, preferably at least two linkages from the group of thiourethane or urea.

11. A method of making a coating based on a coating composition made according to claim 2, wherein said coating composition further comprises a binder, a hardener, a colorant, a filler, a catalyst, a UV-stabilizer, a solvent, an antibacterial agent or a combination thereof.

12. A method comprising using on a structure the coating composition made according to claim 2, further comprising spreading the coating composition on at least part of a surface of a structure and protecting said structure from oil derived fouling or to repel oil or said fouling from the surface of the structure.

13. A method comprising using on a structure the coating composition made according to claim 2, further comprising spreading the coating composition on at least part of a surface of a structure and protecting said structure from crude oil derived fouling or to repel crude oil or said fouling from the surface of the structure.

14. A method comprising using on a structure the coating composition made according to claim 2, further comprising spreading the coating composition to reduce or repel material accumulation on surfaces of the structure, where said accumulation of material can be due to fouling, scaling, or corrosion.

15. A method comprising using on a structure the coating composition made according to claim 2, further comprising spreading the coating composition on a maritime structure and preventing or reducing accumulation of material on or to repel material from on structures used in maritime or offshore environments.

16. A method comprising using on a structure the coating composition made according to claim 2, further comprising spreading the coating composition on an energy converter structure and preventing or reducing accumulation of material on or to repel material from structures used in energy converters such as power plants, where said energy converters include turbines, blades on wind turbines and solar converters.

17. A method comprising using on a structure the coating composition made according to claim 2, further comprising spreading the coating composition on a heat exchanger structure and preventing or reducing to prevent or reduce accumulation of material on or to repel material from structures used in heat exchangers.

18. A method comprising using on a structure the coating composition made according to claim 2, further comprising spreading the coating composition on tubular structures, channels or valves and preventing or reducing to prevent or reduce accumulation of material on or to repel material from structures used in pipes, tubes, channels or valves.

19. The coating composition according to claim 1, where content of said polydimethylsiloxane with a molecular weight of more than 1600 g/mol is between 0.7 and 1.1% based on weight of combined solids and silanes.

\* \* \* \* \*